Figure 2:
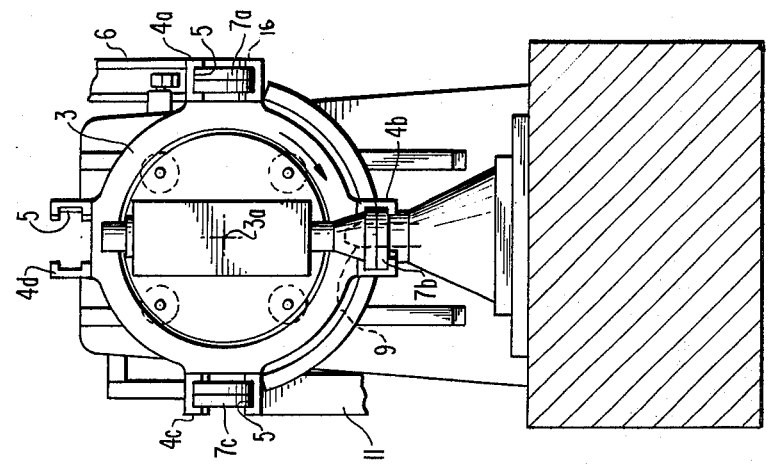

United States Patent [19]

Kaulfuss

[11] 3,999,645
[45] Dec. 28, 1976

[54] WORK HANDLING APPARATUS

[75] Inventor: Paul H. E. Kaulfuss, Schorndorf, Germany

[73] Assignee: Hermann Pfauter, Ludswigsburg, Germany

[22] Filed: Nov. 27, 1973

[21] Appl. No.: 419,382

[30] Foreign Application Priority Data

Nov. 28, 1972 Germany .......................... 2258117

[52] U.S. Cl. .............................. 198/358; 90/21 R; 198/361; 198/655; 214/130 R
[51] Int. Cl. ............................................. B65g 29/00
[58] Field of Search ............ 214/1 Q, 130 R, 1 BC, 214/147 T; 198/239, 25, 20 R, 211; 90/20, 21 R, 79, 83, 21 D

[56] References Cited

UNITED STATES PATENTS

| 2,714,439 | 8/1955 | Prickett et al. .................. 198/25 X |
| 3,000,516 | 9/1961 | Dixon et al. ..................... 214/1 BD |
| 3,670,461 | 6/1972 | Hori ............................. 214/1 BD X |
| 3,795,324 | 3/1974 | Kiwalle ....................... 214/147 T X |

Primary Examiner—Frank E. Werner
Attorney, Agent, or Firm—John J. Byrne; Edward E. Dyson

[57] ABSTRACT

A workpiece handling device including a rotatable ring-like member having a series of workpiece holders spaced thereabout. Upon one partial rotation of the ring one workpiece is transferred from a receiving location to a work station while simultaneously a second workpiece is transferred from the work station to a discharge location.

7 Claims, 2 Drawing Figures

U.S. Patent     Dec. 28, 1976     3,999,645

WORK HANDLING APPARATUS

The present invention relates to a work loading and unloading device for disc or shaft-type workpieces on hobbing machines with a vertical work axis for simultaneous conveyance of a machined workpiece from the machining location to a point of discharge and an unmachined workpiece from a point transfer to the machining location, the gear bodies rolling to, and away from, said loading and unloading device by gravity along inclined guiding chutes with the axis of each gear body disposed in a horizontal position.

The purpose of such a device is to feed workpieces, such as gear blanks, preferably within a line of interlinked machine tools, from a preceding metal-cutting machine to the hobbing machine and to there effect an exchange between blanks and finished gears and then transfer the hobbed gears to following metal-cutting machine with the axis of each gear oriented horizontally.

With known devices of this kind, the workpieces arriving at the end of an inclined feed chute must first be turned by means of a separate device to position them so that the axis of each workpiece will be oriented vertically. A slide mechanism then transfers each workpiece to the loading and unloading device proper where it is simultaneously exchanged for a finished gear which, in turn, is moved to a further turning device by means of the said slide mechanism to be positioned so that it can roll off to a following metal-cutting machine along an inclined discharge chute. This equipment is comparatively elaborate and expensive. It is, therefore, an object of the present invention to substantially simplify the equipment and to reduce this expense.

In accordance with the invention, this object is accomplished by means of a work loading and unloading ring which is rotatably disposed on a vertically movable slide on the support column of the hobbing machine in such a manner that its axis is oriented horizontally and which has four, eight, twelve or sixteen pockets and so on, depending on the size of the workpiece, distributed around its circumference so as to be spaced apart 90°, 45°, 30° or 22.5° and so on. The pockets are interchangeable to suit workpieces of different shapes. The pockets have inclined rolling surfaces and each has an opening toward the rear side of the ring for receiving the unmachined and discharging the machined workpieces. A work loading and unloading ring is lowered and raised by means of the vertically movable slide on a support column to place the workpieces on, and pull them from, a mounting arbor and is correspondingly indexed 90° or an even fraction thereof for each work loading and unloading operation.

To ensure proper feed and discharge, the rolling surfaces of the pockets, according to a further development of the invention, are inclined so that an unmachined workpiece or stack of workpieces will automatically roll into the pocket up to a stop point. A machined workpiece or stack of workpieces will automatically roll out. The sides of the pockets are provided with openings to enable a work arbor to pass freely through the bores of the unmachined workpieces upon lowering the loading and unloading ring, in which the work to be mounted on the arbor is supported with a vertical orientation of its axis and to enable a workpiece to be freely deposited on the base of the chucking fixture and the clamping sleeve to be freely deposited on the base of the chucking fixture and the clamping sleeve to be freely applied to a workpiece. In addition, means are provided which prevent workpieces from rolling out of the feed chute or a pocket while the loading and unloading ring is indexed or raised and lowered.

Further advantages of the invention include:

a. particularly easy interlinkage with other machine tools because of the rolling feed and discharge of the workpieces, b. feed and discharge along inclined chutes, i.e. by gravity without additional mechanical means for positive-flow propulsion, c. complete loading and unloading cycle in one vertical plane, providing for an extremely compact arrangement, d. easy means for centering over the mounting arbor, e. ease of adaptation to different work sizes by means of interchangeable pockets, f. small indexing angles for small workpieces and, thus, corresponding savings in time, g. the possibility of loading stacks of a plurality of workpieces into the correspondingly designed pockets, h. the possibility of handling comparatively large workpieces which in most cases cannot be accommodated by other devices, i. economical construction because of a small number of different individual components.

Figure 1:
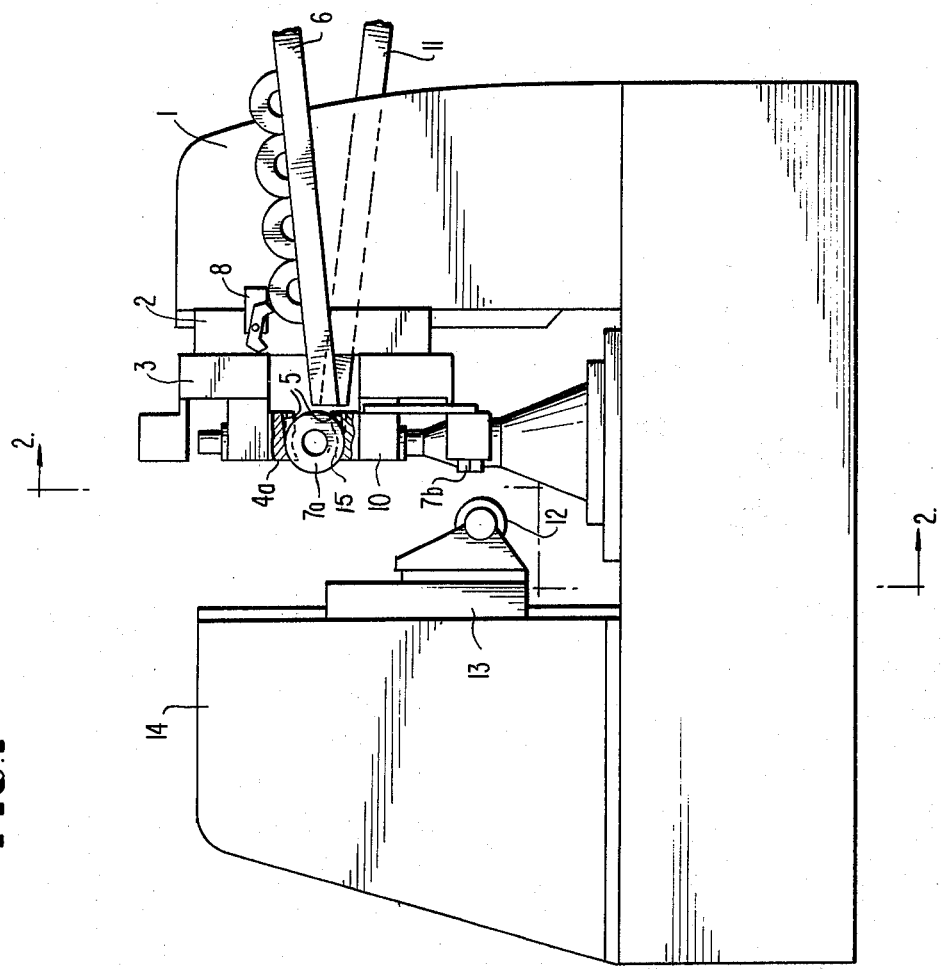

These and other objects of the invention will become more apparent to those skilled in the art by reference to the following detailed description when viewed in light of the accompanying drawing wherein:

FIG. 1 is a diagrammatic front view of the hobbing machine, with vertical work axis incorporating the work loading and unloading device of the invention; and FIG. 2 is a side view of the machine as viewd when looking toward the support column along the line 2—2 of FIG. 1.

Referring now to the drawings wherein like numerals refer to like parts, a support column 1 slidably receives a slide 2 which is raised and lowered by any conventional means. A work loading and unloading ring 3 is secured to the slide 2. Ring 3 is rotated about a theoretical horizontal turning axis 3a by any appropriate drive means. Four rollers attached to slide 2 are provided about which ring 3 can rotate.

In the embodiment shown, the loading and unloading ring 3 is provided with four pockets 4a through 4d, spaced 90° apart. Each pocket is provided with an inclined rolling surface 5. The surfaces 5 provide openings to the pockets which are larger than the workpieces received from the chute. However, the surfaces 5 terminate at stop points 15 which prevent the workpieces from rolling too far forward.

In the lower position of the slide 2, an annular workpiece 7 with a horizontal axis rolls from a feed chute 6 into the pocket 4a while the dispensation of further workpieces is prevented by means of a singling-out device 8. For the loading and unloading operation, the slide 2 with the loading and unloading ring 3, is raised sufficiently to lift the workpiece lying in the lower pocket 4b with its axis disposed vertically clear (above) of a mounting arbor 9. Then the loading and unloading ring 3 is rotated 90° in the direction indicated by the arrow, such that the workpiece 7 comes to rest on a lateral surface of the pocket with its axis disposed in a vertical position over arbor 9. Lowering the slide 2 causes the bore of the workpiece to slide on the mounting arbor. The work so positioned is then clamped by a chucking fixture 10, e.g. hydraulic fixture, which is mounted on slide 2. The workpieces 7 have sufficient play in the pockets 4 to enable them to be properly centered on the mounting arbor. At the same time, the workpiece which was in the lower pocket 4b — and is now at 4c — will roll into the discharge chute 11 when slide 2 is lowered. The sides 16 of the pockets are provided with openings that enable the work arbor to pass freely into the bores of the workpieces upon lowering the ring 3.

The cycle is repeated anew on completion of the hobbing operation with the hob 12 on the axial slide 13, which is fed inwardly by means of the movable machine column or stanchion 14.

The principal advantage of this invention consists in that, instead of a plurality of individual devices, only a single work loading and unloading ring is required to turn the workpieces, which roll off the chute with a horizontally disposed axis, into the proper position for lowering onto the mounting arbor and simultaneously lift a finished workpiece from the mounting arbor, turning it into a position in which it can roll off with its axis disposed horizontally.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

I claim:

1. A work loading and unloading device for disc or shaft-type gear body workpieces on hobbing machines with a vertical work axis for simultaneous conveyance of machined workpieces from a machining location to a point of discharge and of unmachined workpieces from a point of transfer to the machining location, the workpieces rolling to, and away from, said loading and unloading device by gravity along inclined guiding chutes with the axis of each workpiece disposed in a horizontal position, comprising, a mounting arbor at said machining location, a support column, a vertically movable slide on the support column, a work loading and unloading ring rotatably disposed on said slide in such a manner that its axis is oriented horizontally and which has four, eight, twelve or sixteen pockets and so on, depending on the size of the workpiece, distributed around its circumference so as to be spaced apart 90°, 45°, 30° or 22.5° and so on, said pockets being interchangeable to suit workpieces of different shapes and having inclined rolling surfaces and an opening toward the rear side of the ring for receiving the unmachined workpieces and discharging the machined workpieces, said work loading and unloading ring being lowered and raised by means of said vertically movable slide on the support column to place the workpieces on, and pull them from, said mounting arbor and correspondingly indexed 90° or an even fraction thereof for each work loading and unloading operation.

2. A work loading and unloading device as claimed in claim 1 characterized in that said rolling surfaces of said pockets are inclined so that an unmachined workpiece or stack of workpieces will automatically roll into said pockets up to a stop and that a machined workpiece or stack of workpieces will automatically roll out.

3. A work loading and unloading device as claimed in claim 2, characterized in that the sides of said pockets are provided with openings such that said mounting arbor may pass freely through the bores of the unmachined workpieces when the work to be mounted, which is supported in said loading and unloading ring with a vertical orientation of its axis, is lowered onto said mounting arbor and that a workpiece may be freely deposited on the base of said mounting arbor, and a clamping sleeve for securing said workpiece to said arbor.

4. A work loading and unloading device as claimed in claim 2 characterized in that means are provided which prevent workpieces from rolling out of the feed chute or a pocket while said loading and unloading ring is indexed or raised and lowered.

5. A work loading and unloading device as claimed in claim 1, characterized in that the sides of said pockets are provided with holes such that said mounting arbor may pass freely through the bores of the unmachined workpieces when the work to be mounted, which is supported in said loading and unloading ring with a vertical orientation of its axis, is lowered onto said mounting arbor and that a workpiece may be freely deposited on the base of said mounting arbor, and a clamping sleeve for securing said workpiece to said arbor.

6. A working loading and unloading device as claimed in claim 5 characterized in that means are provided which prevent workpieces from rolling out of the feed chute or a pocket while said loading and unloading ring is indexed or raised and lowered.

7. A work loading and unloading device as claimed in claim 1, characterized in that means are provided which prevent workpieces from rolling out of the feed chute or a pocket while said loading and unloading ring is indexed or raised and lowered.

* * * * *